US007610018B2

(12) United States Patent
Marin et al.

(10) Patent No.: US 7,610,018 B2
(45) Date of Patent: Oct. 27, 2009

(54) CHANNEL CHANGE PROCEDURES IN A WIRELESS COMMUNICATIONS NETWORK

(75) Inventors: Janne Marin, Espoo (FI); Janne Tervonen, Espoo (FI)

(73) Assignee: Nokia Corporation, Espoo, FL (US)

( * ) Notice: Subject to any disclaimer, the term of this patent is extended or adjusted under 35 U.S.C. 154(b) by 657 days.

(21) Appl. No.: 11/371,984

(22) Filed: Mar. 10, 2006

(65) Prior Publication Data

US 2007/0213012 A1    Sep. 13, 2007

(51) Int. Cl.
*H04B 15/00* (2006.01)
(52) U.S. Cl. .................. 455/63.3; 455/434; 455/450; 455/455; 455/456.6; 455/41.3; 370/437; 370/458
(58) Field of Classification Search ............... 455/63.3, 455/434, 450, 452.1, 452.2, 452.3, 455, 456.1, 455/456.2, 456.3, 456.6, 522, 552.1, 41.3; 370/437, 458, 338, 329, 330, 448
See application file for complete search history.

(56) References Cited

U.S. PATENT DOCUMENTS

2003/0181213 A1\* 9/2003 Sugar et al. .................. 455/454

(Continued)

FOREIGN PATENT DOCUMENTS

| GB | 2 379 358 A | 3/2003 |
| WO | WO 2005011203 | 2/2005 |
| WO | 2007044985 A2 | 4/2007 |

OTHER PUBLICATIONS

Wireless Media Access Control (MAC) and Physical Layer (PHY) Specifications for High Rate Wireless Personal Area Networks (WPANs) section 6.3-6.5, May 5, 2006.
High Rate Ultra Wideband PHY and MAC Standard; Standard ECMA; vol. ECMA-368, Dec. 1, 2005 (Dec. 1, 2005), pgs. 1-315, 01, XP007900963;.

(Continued)

*Primary Examiner*—Matthew D Anderson
*Assistant Examiner*—Shaima Q Aminzay
(74) *Attorney, Agent, or Firm*—Locke Lord Bissell & Liddell

(57) ABSTRACT

A method, apparatus, and computer program product are disclosed for wireless communications networks, such as WiMedia networks, to solve problems of channel congestion, searching for candidate channels to select, and achieving reliable channel changes that will be recognized by other devices in the network. A wireless communications device selects a channel finding technique in a first stage, based on whether the device has any active connections in a current channel. The device then performs the selected channel finding technique with a plurality of channels to find a candidate channel. Then the initiating device sends a request to at least one remote device to change its channel from the current channel to the candidate channel during a time slot within a repeating time interval. If the request is successful, the initiating device receives an acceptance of the request from the remote device. Then in a second stage, the initiating device selects a channel changing technique based on whether the device has any active connections in the current channel. The initiating device then executes the selected channel changing technique to change a channel from the current channel to the candidate channel, thereby establishing the desired new connection across the candidate channel with the remote device.

27 Claims, 11 Drawing Sheets

U.S. PATENT DOCUMENTS

2004/0037247 A1* 2/2004 Ngo ............................ 370/332
2006/0056344 A1 3/2006 Roy et al.
2006/0126847 A1* 6/2006 Ho .............................. 380/277
2006/0242457 A1 10/2006 Roy et al.
2007/0184870 A1* 8/2007 Muqattash et al. .......... 455/522

OTHER PUBLICATIONS

Part 15.3 Wireless Access Control and physical layer specifications for high rate wireless personal area networks (WPANs) IEEE STD 802.15.3-2003, IEEE, US, Sep. 29, 2003 (Sep. 29, 2003), pgs. 1-315 Sep. 2003 (Sep. 29, 2003, XP002342619.

* cited by examiner

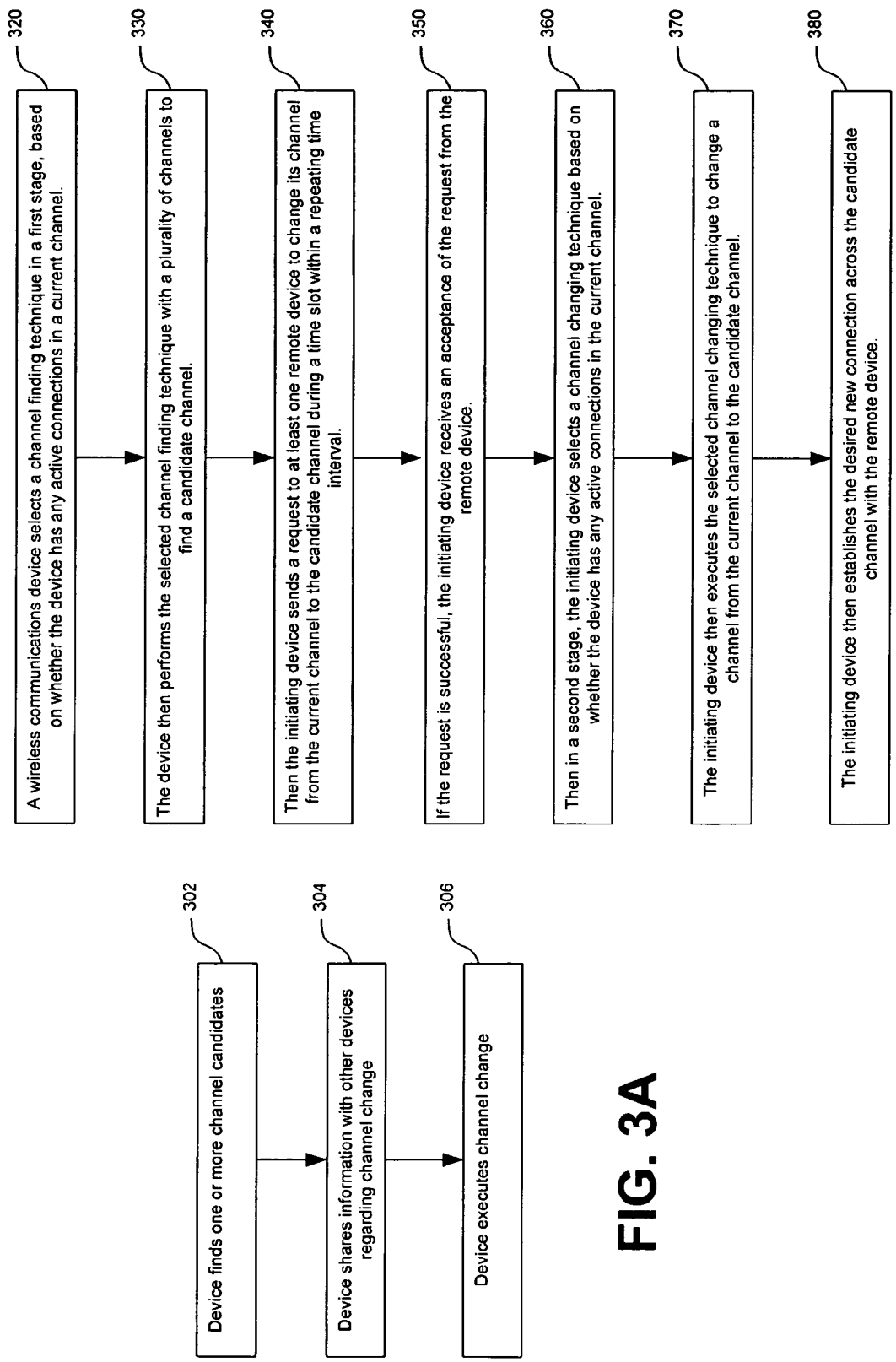

FIG. 10A

Modified Channel Change Information Element 1000

| Octets: 1 | Octets: 1 | Octets: 1 | Octets: 1 | Octets: 2 | ... | Octets: 2 |
|---|---|---|---|---|---|---|
| Element ID (=18) | Length (2 + N * 2) | Channel Change Countdown | New Channel Number | DevAddr 1 | ... | DevAddr N |
| 1002 | 1004 | 1006 | 1008 | 1012 | 1014 | 1016 |

Channel Change Request Information Element 1100

| Octets: 1 | Octets: 1 | Octets: 1 | Octets: 1 | Octets: 2 | ... | Octets: 2 |
|---|---|---|---|---|---|---|
| Element ID (e.g. =24) | Length (2 + N * 2) | Channel Change Countdown | New Channel Number | DevAddr 1 | ... | DevAddr N |
| 1102 | 1104 | 1106 | 1108 | 1112 | 1114 | 1116 |

Channel Change Response Information Element 1200

| Octets: 1 | Octets: 1 | Octets: 1 | Octets: 1 | Octets: 2 |
|---|---|---|---|---|
| Element ID (e.g. =25) | Length (=5) | Response (confirm, reject,...) | Channel Change Countdown | New Channel Number | DevAddr |
| 1202 | 1204 | 1206 | 1208 | 1210 | 1212 |

FIG. 13

Channel Change Request and Response Command Frames 1300

| Octets: 1 | Octets: N |
|---|---|
| Channel Change Command Frame Type | Channel Change Command Frame Payload |

1302 — 1308

Command Frames are sent as MAC payload. The Frame Subtype field for Channel Change Request and Repsonse messages is set to an available value (e.g. = 6) in the corresponding MAC data frame.

FIG. 14

Channel Change Command Frame Type Encoding 1400

| Value | Channel Change Command Frame Payload |
|---|---|
| 0 | Channel Change Request (e.g. Figure 11) |
| 1 | Channel Change Response (e.g. Fig. 12) |
| 2 - 255 | Reserved |

1402 — 1404

The actual contents of Channel Change Request and Response command frames can be defined e.g. as shown in Figure 11 and Figure 12.

CHANNEL CHANGE PROCEDURES IN A WIRELESS COMMUNICATIONS NETWORK

FIELD OF THE INVENTION

The present invention relates to wireless communications. More particularly, the present invention relates to techniques for sharing wireless communications media in wireless network environments.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

High rate physical layer (PHY) techniques for short-range proximity networks are quickly emerging. One such technique involves frequency hopping applications of orthogonal frequency division multiplexing (OFDM). This technique involves the transmission of OFDM symbols at various frequencies according to pre-defined codes, such as Time Frequency Codes (TFCs). Time Frequency Codes can be used to spread interleaved information bits across a larger frequency band.

The WiMedia Alliance has developed an OFDM physical layer. This physical layer is described in WiMedia Alliance *MultiBand OFDM Physical Layer Specification, Release* 1.1, Jan. 14, 2005 (also referred to herein as the WiMedia PHY. This document is incorporated herein by reference in its entirety.

The WiMedia Medium Access Control (MAC) group is developing a MAC layer that would be used with an OFDM physical layer, such as the WiMedia PHY. A current version of this MAC is described in O'Conor, Jay; Brown, Ron (ed.), *Distributed Medium Access Control (MAC) for Wireless Networks, WiMedia Technical Specification, Release* 1.0, Dec. 8, 2005 (also referred to herein as the WiMedia MAC Specification v. 1.0). This document is incorporated herein by reference in its entirety.

This MAC layer involves a group (referred to as a beacon group) of wireless communications devices that are capable of communicating with each other. The timing of beacon groups is based on a repeating pattern of "superframes" in which the devices may be allocated communications resources. These communications resources may be in the form of one or more time slots, referred to as media access slots (MASs).

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The WiMedia MAC provides for the allocation of resources to be performed through communications referred to as beacons. Beacons are transmissions that devices use to convey non-payload information. Each device in a beacon group is assigned a portion of bandwidth to transmit beacons.

Such transmissions allow the WiMedia MAC to operate according to a distributed control approach, in which multiple devices share MAC layer responsibilities. Accordingly, the WiMedia MAC Specification v. 1.0 provides various channel access mechanisms that allow devices to allocate portions of the transmission medium for communications traffic. These mechanisms include a protocol called the distributed reservation protocol (DRP) in which reservations for connections are negotiated among devices. These mechanisms also include a protocol called prioritized contention access (PCA).

The WiMedia PHY provides for various channels across a frequency range. These channels are referred to as logical channels. Each logical channel employs a different Time Frequency Code (TFC). As discussed above, TFCs specify a repeating time sequence in which various frequency bands within a frequency range are used. Thus, a device employing a TFC transmits at different frequencies at particular times specified by the TFC. Currently, the WiMedia PHY specifies each band having a 528 MHz bandwidth. Also, these bands are within a frequency operating range of between 3.1 and 10.6 GHz.

The current WiMedia MAC (WiMedia MAC Specification v. 1.0) is limited to elementary techniques for handling channel changes. Moreover, the current WiMedia MAC fails to provide any tools for device(s) to search for channel candidates after joining a beacon group. If a current WiMedia MAC device decides to change or re-select a beacon group channel, it can send a Channel Change IE notice in its beacon to inform the other devices on that beacon group. However, the current WiMedia MAC provides no guarantee that the other devices in the beacon group will follow the device to another channel. Thus, channel-changing devices are in jeopardy of losing existing connections as well as basic connectivity under the current WiMedia MAC specification.

Many situations can occur in which a channel change is desirable (for either a device or to a group of device). One such situation occurs when a currently used channel (i.e. a beacon group) is congested. This congested condition may be attributed to a large number of devices in the beacon group and/or to a lack of available resources for a new application or DRP reservation. The potential for such congested conditions occurring is substantial. One reason for this is because the current WiMedia MAC specification allows even two devices (e.g. two WUSB hosts) to reserve almost a full superframe (224 out of 256 MASs).

Other situations in which a channel change is desirable occur when radio conditions for the current channel are poor (e.g. interference, frame error rate, etc.), the achievable range on the current radio channel is insufficient, and/or a specific device is found operating on another channel. Current WiMedia implementations only require devices to listen to a single channel at a time, thus limiting the choices for channel changes that can be recognized by a device.

SUMMARY OF THE INVENTION

The problems of channel congestion, searching for candidate channels to select, and achieving reliable channel changes that will be recognized by other devices in the network are overcome by the embodiments of the invention disclosed herein.

In an example embodiment of the invention, a wireless communications device selects a channel finding technique in a first stage, based on whether the device has any active connections in a current channel. The device then performs the selected channel finding technique with a plurality of channels to find a candidate channel. Then the initiating device sends a request to at least one remote device to change its channel from the current channel to the candidate channel during a time slot within a repeating time interval. If the request is successful, the initiating device receives an acceptance of the request from the remote device. Then in a second stage, the initiating device selects a channel changing technique based on whether the device has any active connections in the current channel. The initiating device then executes the selected channel changing technique to change a channel from the current channel to the candidate channel, thereby establishing the desired new connection across the candidate channel with the remote device.

In one embodiment, the selected channel finding technique broadcasts a beacon transmission that the initiating device will hibernate. The initiating device then proceeds to scan for available channels during hibernation, either to find a best available radio channel or to find a specific target device.

In another embodiment, the selected channel finding technique broadcasts a beacon transmission that the initiating device will be unavailable for a predetermined number of superframes. Then the initiating device scans for available channels during the predetermined number of superframes, either to find a best available radio channel or to find a specific target device.

In a further embodiment, the selected channel finding technique scans one channel at a time, alternating between broadcasting a beacon transmission in the initiating device's original channel, then scanning in a first new channel, then returning s to its original channel for at least one superframe in order to continue communications therein, followed by scanning in a second new channel, so that it scans one new channel at a time, either to find a best available radio channel or to find a specific target device.

In another embodiment, the selected channel finding technique broadcasts a beacon transmission to inform peer devices in the initiating device's beacon group that the initiating device is performing ongoing channel selection operations. The peer devices then maintain the initiating device's reservation and status in the initiating device's original channel for a predetermined number of superframes, in response to the broadcasting.

In still another embodiment, the selected channel finding technique broadcasts a beacon transmission to inform peer devices in the initiating device's beacon group that the initiating device is performing ongoing channel selection operations for a stated number of superframes. The peer devices then maintain the initiating device's reservation and status in the initiating device's original channel for the stated number of superframes, in response to the broadcasting.

In a further embodiment, the selected channel finding technique broadcasts a beacon transmission to inform peer devices in the initiating device's beacon group that the initiating device will be unavailable for a stated number of superframes. The peer devices then maintain the initiating device's reservation and status in the initiating device's original channel for the stated number of superframes, in response to the broadcasting.

In another embodiment, the selected channel changing technique transmits an information element including a list of identifiers of peer devices in the initiating device's beacon group, the information element including a request to change channel with the initiating device. The peer devices then respond whether they accept the request.

In this manner, the resulting invention solves problems of channel congestion, searching for candidate channels to select, and achieving reliable channel changes that will be recognized by other devices in the network.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 3A is a flowchart of a channel changing process according to embodiments of the present invention;

FIG. 3B is a more detailed flowchart of an exemplary channel changing process, according to embodiments of the present invention;

FIG. 10A is a diagram of a modified Channel Change Information Element;

FIG. 11 is a diagram of a new Channel Change Request Information Element;

FIG. 12 is a diagram of a new Channel Change Response Information Element;

FIG. 13 is a diagram of a Command Frame definition for Channel Change Request and Response; and FIG. 14 is a diagram of a Channel Change Command Frame Type encoding.

DETAILED DESCRIPTION OF THE PREFERRED EMBODIMENTS

I. Operational Environment

Figure 1:
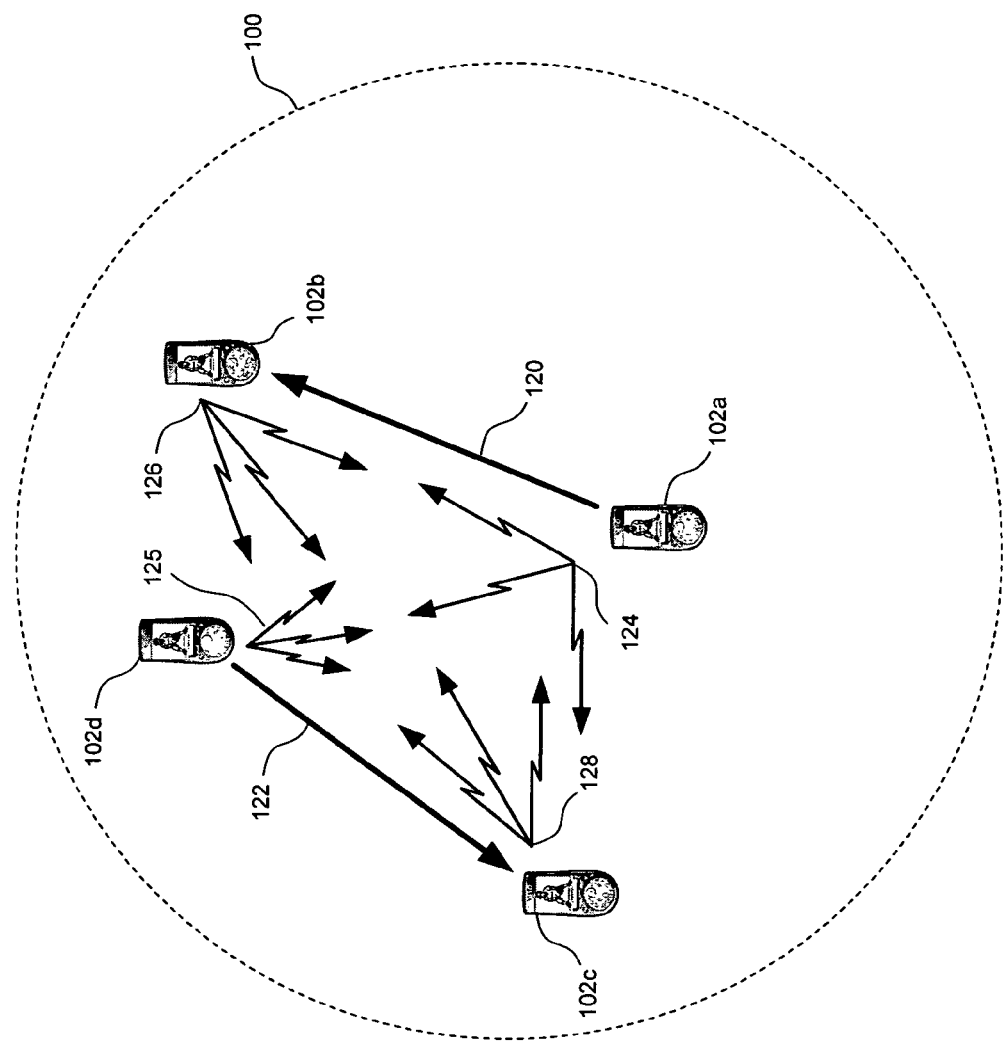
FIG. 1 is a diagram of an exemplary operational environment.

FIG. 1 is a diagram of a communications environment in which the techniques of the present invention may be employed. This environment includes a beacon group 100 in which multiple communications devices (DEVs) 102 may exchange wireless transmissions. In particular, FIG. 1 shows a device 102*a* sending a wireless transmission 120 to a device 102*b*. Also, FIG. 1 shows a device 102*d* sending a wireless transmission 122 to a device 102*c*.

Transmissions 120 and 122 are shown as being point-to-point communications. However, each of devices 102 periodically sends a transmission referred to as a beacon, which is directed (broadcast) to each device in beacon group 100. For instance, FIG. 1 shows device 102*a* transmitting a beacon 124, device 102*b* transmitting a beacon 126, device 102*c* transmitting a beacon 128 and device 102*d* transmitting beacon 125. Beacon transmissions are described in greater detail below.

II. Superframe

Figure 2A:
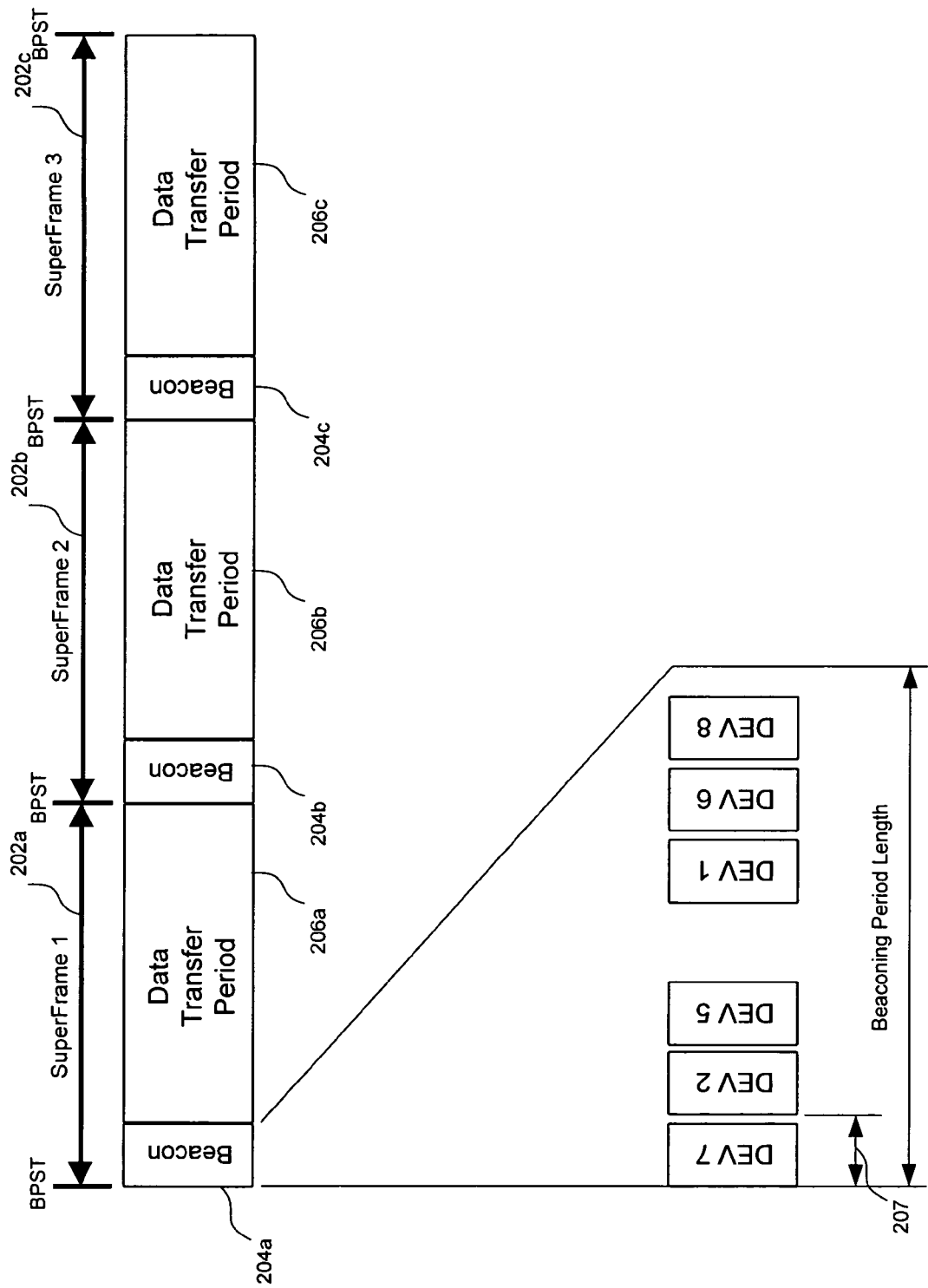
FIGS. 2A and 2B are diagrams of superframe formats employed in shared transmission media.

Wireless network transmissions in the environment of FIG. 1, such as beacons and data communications may be based on a repeating time pattern, such as a superframe. An exemplary superframe format is shown in FIG. 2A. In particular, FIG. 2A shows a frame format having superframes 202a, 202b, and 202c.

Each superframe 202 includes a beacon period 204 and a data transfer period 206. Beacon periods 204 convey transmissions from each of the active devices in the beaconing group. Accordingly, each beacon period 204 includes multiple beacon slots 207. Slots 207 each correspond to a particular device in the network. The devices employing beacon slots 207 are referred to as a beaconing group. During these slots, the corresponding device may transmit various overhead or networking information. For WiMedia networks, such information may be in predetermined forms called Information Elements (IEs).

For instance, such information may be used to set resource allocations and to communicate management information for the beaconing group. In addition, according to the present invention, data transfer periods 206 may be used to transmit information regarding services and features (e.g., information services, applications, games, topologies, rates, security features, etc.) of devices within the beaconing group. The transmission of such information in beacon periods 204 may be in response to requests from other devices.

Data transfer period 206 is used for devices to communicate data according to various transmission schemes. These schemes may include, for example, frequency hopping techniques that employ OFDM and/or time frequency codes (TFCs). For instance, data transfer periods 206 may support data communications across links 120 and 122. In addition, devices (e.g., DEVs 102a-d) may use data transfer periods 206 to transmit control information, such as request messages to other devices. The current WiMedia MAC provides for command and control frames for the transfer of such information. To facilitate the transmission of traffic, each device may be allocated one or more particular time slots within each data transfer period 206. In the context of the WiMedia MAC, these time slots are referred to as media access slots (MASs).

A MAS is a period of time within data transfer period 206 in which two or more devices can exchange data (i.e., communicate). According to the WiMedia MAC, MASs may be allocated by a distributed protocol, called the distributed reservation protocol (DRP). DRP protects the MASs from contention access by devices acknowledging the reservation. Alternatively, the WiMedia MAC provides for resource allocation according to a prioritized contention access (PCA) protocol. Unlike DRP, PCA isn't constrained to reserving one or more entire MASs. Instead, PCA can be used to allocate any part of the superframe that is not reserved for beaconing or DRP reservations.

Figure 2B:
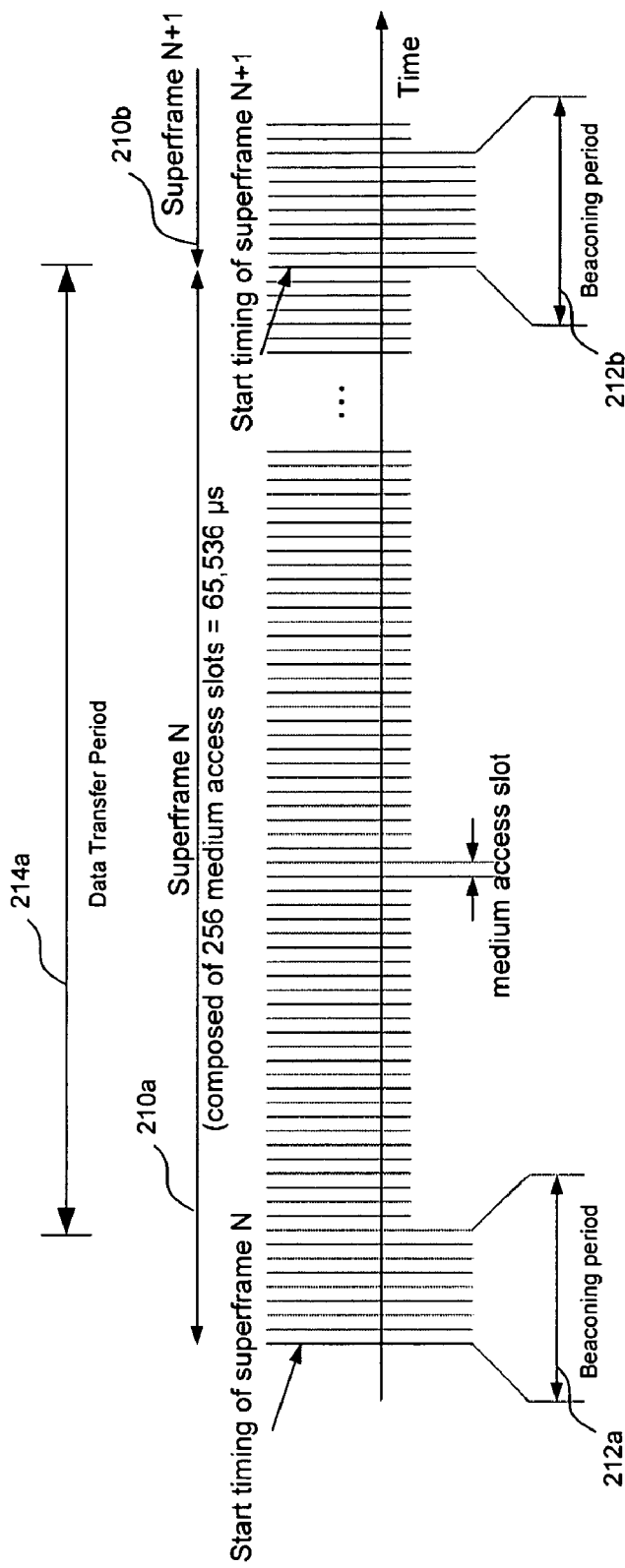

FIG. 2B is a diagram of a frame format designated by the WiMedia MAC Specification v. 1.0. Like the frame format of FIG. 2A, the WiMedia frame format has successive superframes 210. As shown in FIG. 2B, the current WiMedia superframe includes 256 MASs and has duration of 65,536 microseconds. Within each WiMedia superframe 210, a first set of MAS(s) is designated as a beaconing period 212. The number of MASs in this period is flexible, so it may dynamically change. The remaining portion of the (i.e., non-beaconing period portion) of WiMedia superframe 210 is designated as a data transfer period 214.

III. Channel Change Overview

The present invention provides techniques for a device to find best available channel for its needs. Such a channel may be found when the device has already joined a beacon group (and has thus selected a channel). Also, this may occur when the device has connection(s) or other active data transmission(s) with one or more other devices. Embodiments of the present invention involve procedures for finding the best available channel as fast as possible.

If the device has already joined a beacon group, finding the best available channel involves scanning the other channels and possibly scanning for other devices. However, given the current WiMedia PHY and WiMedia MAC, such scanning is not currently possible after joining a beacon group on a specific channel. Also, if a device has connections with one or more other devices, it is desirable for the device to find a new channel that meets its needs without losing its existing connections. In addition, it is desirable for the device to ensure that the other device(s) will follow it into the new channel (or at least know which devices are willing to follow it into the new channel)

The current WiMedia PHY and WiMedia MAC provide no mechanisms for such channel changes. Thus, the present invention provides solutions for finding a new channel candidate, sharing channel change related information, and executing a channel change. Accordingly, FIG. 3A is a flowchart of an exemplary channel changing process, according to embodiments of the present invention.

The process of FIG. 3A includes a step 302 in which a device finds one or more channel candidates. Step 302 may employ different techniques based on various factors. For instance, certain techniques may be employed when the device has no active connections (e.g., DRP reservations), but may have active PCA data transmissions in the current channel, while other techniques may be employed when the device has one or more active connections (e.g. DRP reservations) in the current channel.

In a step 304, the device shares information with other devices in its network (e.g., beacon group). This information is related to a contemplated or planned channel change. Step 304 may comprise exchanging information through various information elements (IEs) in beacon transmissions. Alternatively, step 304 may include the exchange of control/command frames (which are non-beacon, payload transmissions containing control/command information).

After this exchange of information, the device may execute a channel change in a step 306. This change may employ different techniques based on various factors. For instance, certain techniques may be employed when the device has no active connections (e.g., DRP reservations), but may have active PCA data transmissions in the current channel, while other techniques may be employed when the device has one or more active connections (e.g. DRP reservations) in the current channel. In embodiments of the present invention, the other device(s) having connections with the device follow the channel change.

FIG. 3B is a more detailed flowchart of an exemplary channel changing process, according to embodiments of the present invention. The flow diagram of FIG. 3B represents a computer program and the steps of the flow diagram represent programmed instructions of the computer program that, when executed by a computer program processor, carry out the functions of the invention.

Step 320: Initially, a wireless communications device selects a channel finding technique in a first stage, based on whether the device has any active connections in a current channel.

Step 330: The device then performs the selected channel finding technique with a plurality of channels to find a candidate channel.

Step 340: Then the initiating device sends a request to at least one remote device to change its channel from the current channel to the candidate channel during a time slot within a repeating time interval.

Step 350: If the request is successful, the initiating device receives an acceptance of the request from the remote device.

Step 360: Then in a second stage, the initiating device selects a channel changing technique based on whether the device has any active connections in the current channel.

Step 370: The initiating device then executes the selected channel changing technique to change a channel from the current channel to the candidate channel.

Step 380: The initiating device then establishes the desired new connection across the candidate channel with the remote device.

IV. Finding New Channel Candidates

A device may employ various techniques to find a channel candidate. Selection of these techniques is based on whether the device has any connections or active data transmissions. More particularly, certain techniques may be selected when a device has joined a beacon group, but has no active connections (e.g., DRP reservations), but may have active PCA data transmissions. Similarly, certain techniques may be employed when a device has an active connection (e.g., a DRP reservation).

A. No Active DRP Reservations

When a device has no active connections, but may have active PCA data transmissions, embodiments of the present invention provide two alternative techniques. The first alternative technique involves hibernation. In particular, the device announces (e.g., in a beacon transmission) that it will hibernate. During the device's hibernation period, the device scans the available channels. This scanning is directed at finding either the best available radio channels or at finding a specific target device.

After finding a new candidate channel, the device returns to original channel and wakes up from the hibernation. Thus, this technique does not require any changes to the WiMedia MAC.

Figure 9A:
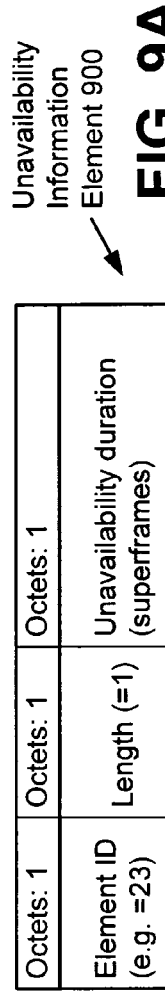
FIG. 9A is a diagram of a new Unavailability Information Element.
Figure 9B:
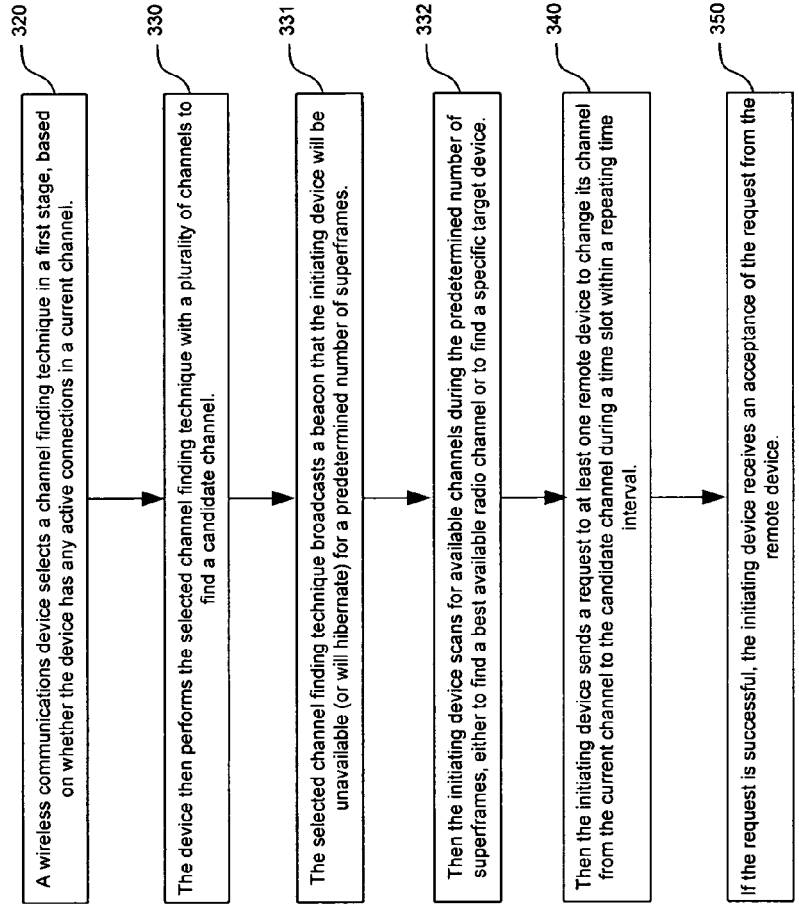
FIG. 9B is a flow diagram of the channel finding technique using the Unavailability Information Element.

A second alternative shown in FIG. 9A involves the addition of a new information element (IE) 900 to the current WiMedia MAC. This new Unavailability IE 900 includes three fields. A first field 902 is the element's ID, for example the value 23. A second field 904 gives the length of the following fields, in this case a length of one octet. The third field 906 gives the unavailability duration in units of superframes. In one embodiment, the number of superframes of unavailability is predetermined. In another embodiment, the number of superframes of unavailability is expressly stated in the field 906. Thus, the Unavailability IE 900 contains information, which indicates that the device will be unavailable for a predetermined number of superframes (N superframes). During the device's absence, the other devices in the beacon group still update the device's status in their own beacons. Also during the device's absence, the device scans the available channels for either the best available radio channels or a specific target device. FIG. 9B is a flow diagram of the channel finding technique using the Unavailability information element (IE) 900. The initial channel finding Steps 320 and 330 of FIG. 9B are the same as those same numbered steps described for FIG. 3B. In Step 320: Initially, a wireless communications device selects a channel finding technique in a first stage, based on whether the device has any active connections in a current channel. In Step 330: The device then performs the selected channel finding technique with a plurality of channels to find a candidate channel. In Step 331, the selected channel finding technique broadcasts a beacon with the Unavailability information element (IE) 900 indicating that the initiating device will be unavailable (or that the initiating device will hibernate) for a predetermined number of superframes. Then in Step 332, the initiating device scans for available channels during the predetermined number of superframes, either to find a best available radio channel or to find a specific target device. The following Steps 340 and 350 of FIG. 9B are the same as those same numbered steps described for FIG. 3B. In Step 340: If a suitable channel is found, then the initiating device sends a request to at least one remote device to change its channel from the current channel to the candidate channel during a time slot within a repeating time interval. In Step 350: If the request is successful, the initiating device receives an acceptance of the request from the remote device.

B. Active DRP Reservations

When a device has joined a beacon group and has an active DRP reservation, certain timing delays occur in finding a new channel candidate. For instance, in the context of the current WiMedia MAC, such delays are at least two superframes in duration. More particularly, it may require at least one superframe for the device to synchronize to the new channel and receive needed information from the new channel. In addition, one superframe may be required for the device to synchronize to the old channel again.

However, it is undesirable for such delays to extend beyond two superframes. This is because (in the current WiMedia MAC specification) after mMaxLostBeacons, which is currently identified as three superframes in the WiMedia MAC specification, if no beacon is received from a device, all active DRPs are released and device itself is assumed to be lost. To accommodate such constraints, the present invention provides various alternative techniques.

In a first technique, the device sends a beacon in its old channel and changes to new channel. Then the device scans the new channel and returns to the original (old) channel for one or two superframes in order to continue its DRP reservations (as well as to send or receive possible data). Thus, the device scans one channel at a time. This technique does not require changes to the current WiMedia MAC Specification.

A second technique requires changes to the current WiMedia MAC specification. This technique adds a new field (e.g., a 1-bit field) to the DRP IE. This new field informs peer devices (devices in the beacon group) of the original channel that the device is performing ongoing channel selection operations by including the corresponding field in the DRP IE in its beacon. Upon receiving a DRP IE having this field, the peer device(s) maintain the device's reservation and status in the original channel for a predetermined number (N) superframes (e.g., N=[2, 2*(# of channels−1)], in the current WiMedia PHY specification 30 channels are defined. Thus, N=[2, 58]). Although this technique requires changes to the WiMedia MAC specification, the current DRP IE has room to accommodate this new field (e.g. in 3-bit Reserved field in DRP Control Field).

A third technique also requires changes to the current WiMedia MAC specification. In this technique, a new field (e.g., a 3-bit field) is added to the DRP IE. This new field informs peer devices (devices in the beacon group) of the original channel that the device is performing ongoing channel selection operations for a certain number of superframes indicated by this new field. For example, when a three bit field is employed such channel selection operations may occur for 1 to 7 superframes. In embodiments, a zero value indicates no ongoing channel selection operations.

During this indicated number of superframes, the peer device(s) keeps up the device's reservation and status in the original channel by including the corresponding DRP IE in its beacon. As with the second technique, this technique requires changes to the current WiMedia MAC specification. However, the current DRP IE has room to accommodate this new field (e.g. the 3-bit Reserved field in DRP Control Field).

According to a fourth technique, the Reservation Status bit of the DRP IE is changed to zero with a new Reason Code called "Channel Selection Ongoing". Upon receiving such a DRP IE, the peer device(s) maintain by including the corresponding DRP IE in its beacon the device's reservation and status in the original channel for a predetermined number (N) superframes (e.g. N=[2, 2*(# of channels−1)], in the current WiMedia PHY specification 30 channels are defined. Thus, N=[2, 58]). This technique requires changes to the WiMedia MAC specification.

A fifth technique modifies the current WiMedia MAC specification by adding a new IE for beacon transmissions shown in FIG. 9A. This new IE contains information that the device will be unavailable for a certain number (N) of superframes. Upon receipt of this IE, the peer devices for the DRP reservations maintain (keep up) the device's reservation and the peer devices still update the device status in their own beacons during this period of unavailability.

V. Information Sharing

Unlike the aforementioned techniques for finding candidate channels, information sharing is independent of any active data transmission. The current WiMedia MAC specification allows a device to inform other devices that it is changing its channel by using the Channel Change IE. However, other devices are not required to follow the device to the new channel.

Figure 10B:
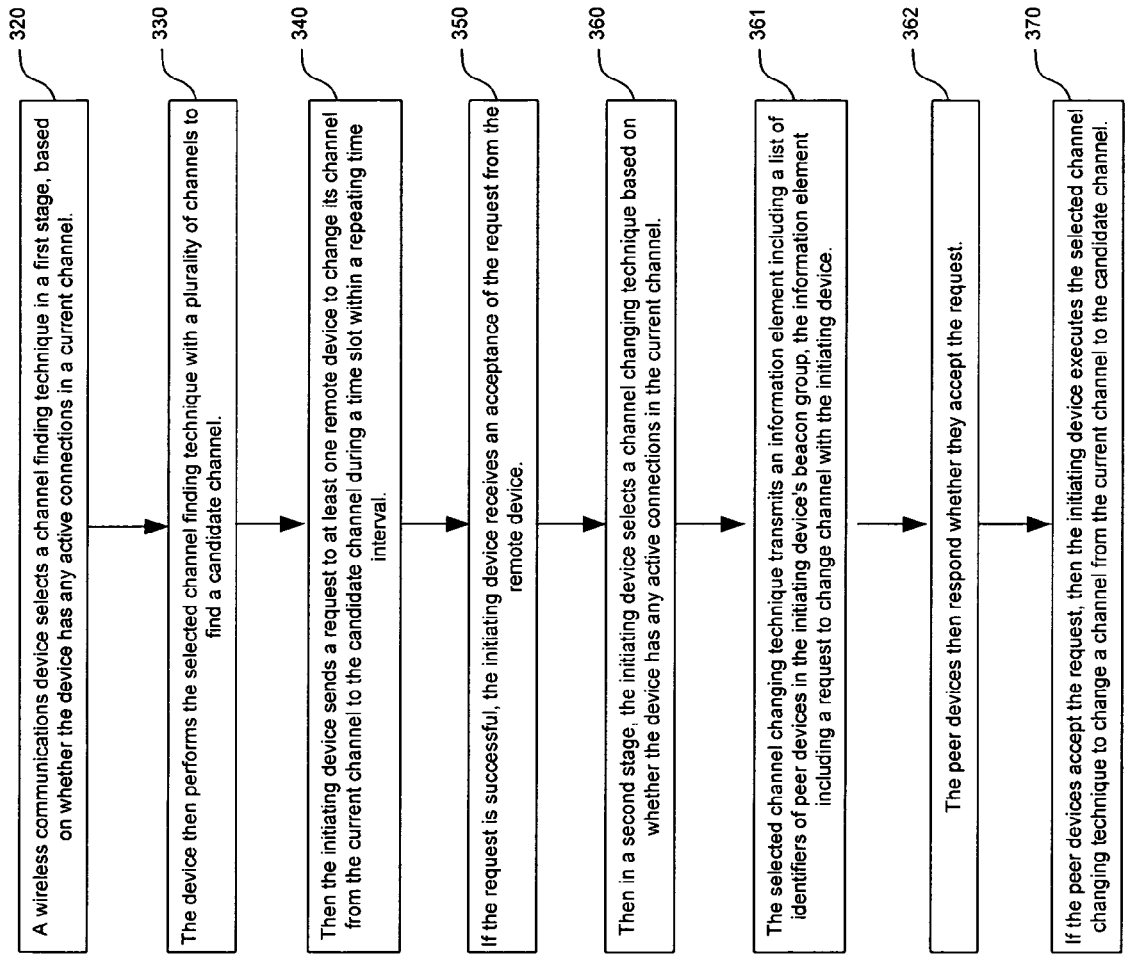
FIG. 10B is a flow diagram of the channel changing technique using the modified Channel Change Information Element.

To overcome this shortcoming, the present invention provides various techniques. For example, a first technique expands the existing Channel Change IE by adding a new list element. The modified Channel Change Information Element 1000 of FIG. 10A includes the following fields. A first field 1002 is the element ID, for example "18". The second field 1004 is the length of the remaining fields, in this case it is two octets for fields 1006 and 1008 plus two additional octets for each of N device addresses listed in fields 1012 through 1014 to 1016 of the list element 1010. Field 1006 is the channel change countdown and field 1008 is the new channel number being requested by the IE 1000. This new list element 1010 contains device identifiers (DEV IDs) of the peer devices that are requested to change channel with the device originating the modified Channel Change IE 1000. This list 1010 may specify a group of devices that, for example, belong to the same context (e.g. a person's data storage and data display). The Channel Change information element (IE) 1000 shown in FIG. 10A may include a new channel indicator and a countdown timer. FIG. 10B is a flow diagram of the channel changing technique using the Modified Channel Change IE 1000. The channel finding Steps 320-350 and the initial channel changing Step 360 of FIG. 9B are the same as those same numbered steps described for FIG. 3B. In Step 361, the selected channel changing technique transmits a beacon including the Modified Channel Change IE 1000 that includes the list 1010 of identifiers of peer devices in the initiating device's beacon group, the information element 1000 including a request to change channel with the initiating device to a new channel number in field 1008.

Upon receiving such an IE, each device in the list responds with its own Channel Change IE to accept the request. This IE contains the initiator's DEV ID as well as the same channel and countdown time as in the initiator's message. In Step 362 of FIG. 10B, the peer devices are shown responding whether they accept the request. Then in Step 370, the initiating device executes the selected channel changing technique to change a channel from the current channel to the candidate channel.

A second technique for sharing channel change information involves modifying the current WiMedia MAC to include a new Channel Change Request IE 1100 shown in FIG. 11 and a Channel Change Response IE 1200 shown in FIG. 12. The Channel Change Request Information Element 1100 of FIG. 11 includes the following fields. A first field 1102 is the element ID, for example "24". The second field 1104 is the length of the remaining fields, in this case it is two octets for fields 1106 and 1108 plus two additional octets for each of N device addresses listed in fields 1112 through 1114 to 1116 of the list element 1110. Field 1106 is the channel change countdown and field 1108 is the new channel number being requested by the IE 1100. In embodiments of the present invention, the Channel Change Request IE 1100 contains a list 1110 of DEV IDs of peer devices that are requested to change channel with the device transmitting this IE 1100. In addition, the Channel Change Request IE 1100 includes a new channel identifier in field 1108 and a countdown timer in field 1106.

Upon receiving a Channel Change Request IE 1100, each device in the list responds with its own Channel Change Response IE 1200 shown in FIG. 12. The Channel Change Response Information Element 1200 of FIG. 12 includes the following fields. A first field 1202 is the element ID, for example "25". The second field 1204 is the length of the remaining fields, in this case it is five octets for fields 1206, 1208, 1210, and 1212. In embodiments, this IE 1200 contains either a positive confirmation or a rejection in field 1206 of the channel change requested in the Channel Change Request IE 1100. Field 1208 is the channel change countdown and field 1210 is the new channel number that the responding device is agreeing to change to, as was requested in the IE 1100. The flow diagram of FIG. 10B also applies to the channel changing technique using the Channel Change Request IE 1100 of FIG. 11 and the Channel Change Response IE 1200 of FIG. 12.

A third technique for sharing channel change information involves providing new control/command frames. Thus, this technique requires changes to the current WiMedia MAC specification. For instance, embodiments of the present invention add a new command/control frame, Channel Change Request and Response command frame 1300 shown in FIG. 13, which is identified by a Frame Type value in field 1302. An example of Channel Change Command Frame Type Encoding 1400 shown in FIG. 14, with the Frame Type value 1402 indicating the type of Channel Change Command Frame Payload 1404. Command Frames are sent as MAC payload, with the payload occupying N octets in field 1308. A Frame Type 1402 with a first value of "zero" can identify that a Channel Change Request (with information similar to the Channel Change Request Information Element 1100 of FIG. 11) is in the payload in field 1308. A Frame Type 1402 with a second value of "one" can identify that a Channel Change Response (with information similar to the information in the Channel Change Response Information Element 1200 of FIG. 12) is in the payload in field 1308. The frame 1300 contains a list of DEV IDs in payload field 1308 for a Channel Change Request, which identifies devices that are requested to change their channel along with the device transmitting this control frame. In addition, this control frame 1300 for a Channel Change Request provides a new channel identifier and a countdown timer in payload field 1308, similar to the information in the Channel Change Request Information Element 1100 of FIG. 11.

Devices included in the device list of the Channel Change Request frame respond with a Channel Change Response frame having information in payload field 1308 similar to the information in the Channel Change Response Information Element 1200 of FIG. 12. This Channel Change Response frame contains either a positive confirmation or a rejection of the requested channel change in payload field 1308, similar to the Channel Change Response Information Element 1200. However, in alternate embodiments, a rejection may instead be made with an additional Channel Change Reject message. For high security devices, command/control frames can be sent in a secure manner.

VI. Channel Change Execution

In embodiments of the present invention, channel change execution is based on whether the changing device has active DRP reservations. If the device has no active DRP reservations, the changing device changes to the new channel according to channel change information using MAC procedures. Once the channel change has occurred, the device selects a new beacon slot in the new channel and resumes normal mode of operation.

In embodiments of the present invention, when a device changes its channel, other device(s) having DRP reservations with the device follow the channel change as agreed on information sharing phase. Accordingly, if the device has active DRP reservations, the device (and its associated channel changing devices) change to the new channel according to channel change information using MAC procedures. Once the channel change has occurred, each device selects a new beacon slot in the new channel. In embodiments, all existing DRPs from the old channel are renegotiated in the new channel.

Moreover, in embodiments of the present invention, after changing channels, a device may be precluded from changing its channel again within a certain time (e.g., 50 superframes). This feature advantageously prevents continuous channel changes (so called "ping-pong" effect)

VII. Information Elements

In embodiments of the present invention, various information elements (IEs) are transmitted to carry out the aforementioned techniques. Such IEs include for example DRP IEs and Channel Change IEs. These IEs are described below with reference to FIGS. 4-12.

Figure 4:
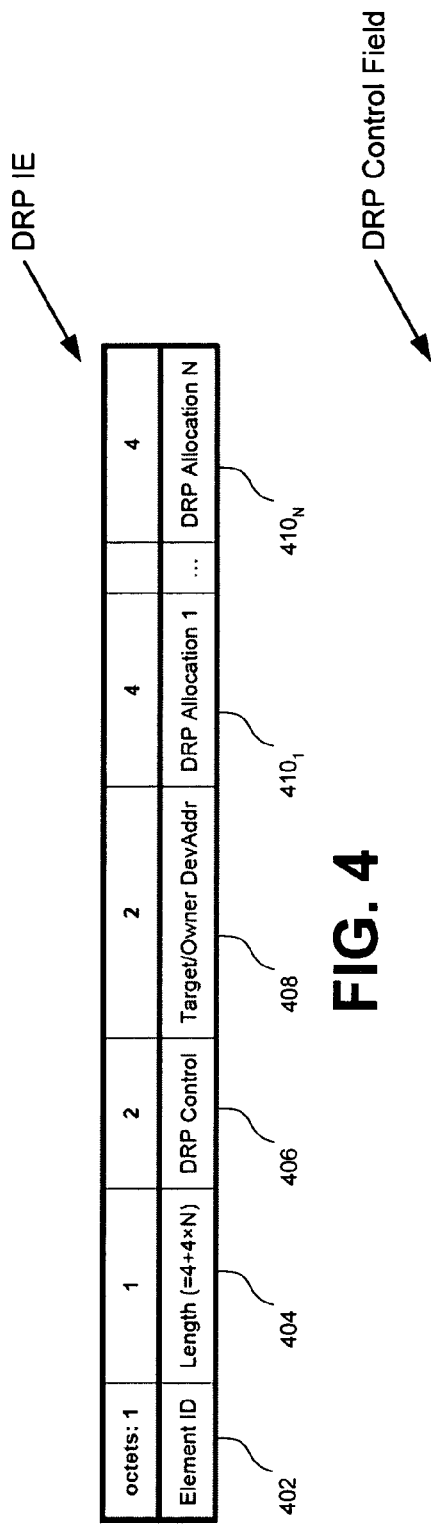
FIGS. 4-6 are diagrams involving the format of a Distributed Reservation Protocol Information Element.
Figure 5:
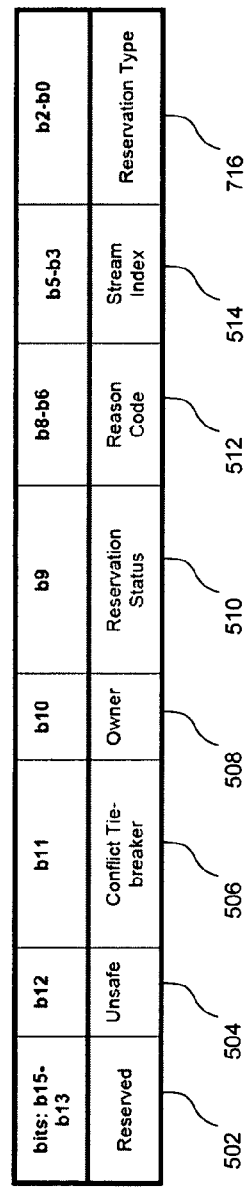

DRP IEs are described with reference to FIGS. 4-6. These IEs are used to negotiate a reservation for certain MASs. In addition, DRP IEs are used to announce the reserved MASs. FIG. 4 is a diagram of a DRP IE format according to the current WiMedia MAC standard. The DRP IE shown in FIG. 4 includes an Element ID field 402, a Length field 404, a DRP Control field 406, a Target/Owner DevAddr field 408, and one or more DRP Allocation fields 410.

Fields 402 and 404 identify the IE as a DRP IE and indicate its length. FIG. 5 is a diagram showing the format of DRP Control Field 406. As shown in FIG. 5, this field includes a reserved field 502, an unsafe field 504, a conflict tie-breaker field 506, an owner field 508, a reservation status field 510, a reason code field 512, a stream index field 514, and a reservation type field 516

Unsafe field 504 indicates whether any of the MASs identified in DRP Allocation Fields 410 are considered unsafe because they exceed one or more specified reservation limit(s). Such an indication exists when unsafe field 504 is set to "1".

Owner field 508 is set to "1" if the transmitting device is the owner of the reservation. Otherwise this field is set to "0" when the transmitting device is the target.

Reservation status field 510 indicates the status of the DRP negotiation process. For instance, this field is set to "0" when the corresponding reservation is under negotiation or in conflict. In contrast, this field is set to "1" when the transmitting device is confirming a reservation or maintaining an established reservation.

Reason code field 512 is used by a reservation target. This field indicates whether a DRP reservation request was successful and whether a reservation has been modified. The encoding scheme of this field is provided below in Table 1.

TABLE 1

Reason Code Field Encoding

| Value | Code | Meaning |
|---|---|---|
| 0 | Accepted | The DRP reservation request is successful |
| 1 | Conflict | The DRP reservation request or existing reservation is in conflict with one or more existing DRP reservations |
| 2 | Pending | The DRP reservation request is being processed |
| 3 | Denied | The DRP reservation request is rejected or existing DRP reservation can no longer be accepted |
| 4 | Modified | The DRP reservation is still maintained but has been reduced in size or multiple DRP IEs for the same reservation have been combined |
| 5-7 | Reserved | Reserved |

Stream index field 514 identifies the stream of data to be sent in the reservation. Conflict tie breaker field 506 contains a randomly generated bit value.

Reservation type field 516 indicates the type of reservation. The encoding scheme for this field is provided below in Table 2.

TABLE 2

Reservation Type Field Encoding

| Value | Reservation Type |
|---|---|
| 0 | Alien BP |
| 1 | Hard |
| 2 | Soft |
| 3 | Private |
| 4 | PCA |
| 5-7 | Reserved |

Figure 6:
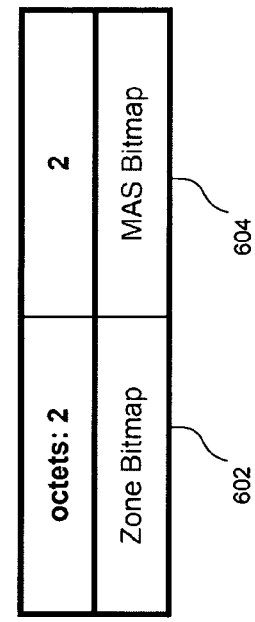

FIG. 6 provides the format of a DRP Allocation field 410. As shown in FIG. 6, a DRP Allocation field 410 includes a Zone Bitmap 602 and a MAS Bitmap 604. Zone Bitmap field 602 identifies particular zones containing reserved MASs. If a bit in the field is set to one, the corresponding zone contains reserved MASs. However, if a bit is set to zero, there are no reserved MASs in the corresponding zone. MAS Bitmap 604 indicates which MASs in the zones identified by Zone Bitmap field 602 are part of the reservation. If a bit in field 604 is set to one, the corresponding MAS within each zone identified by the Zone Bitmap is included.

VIII. Wireless Communications Device

Figure 7:
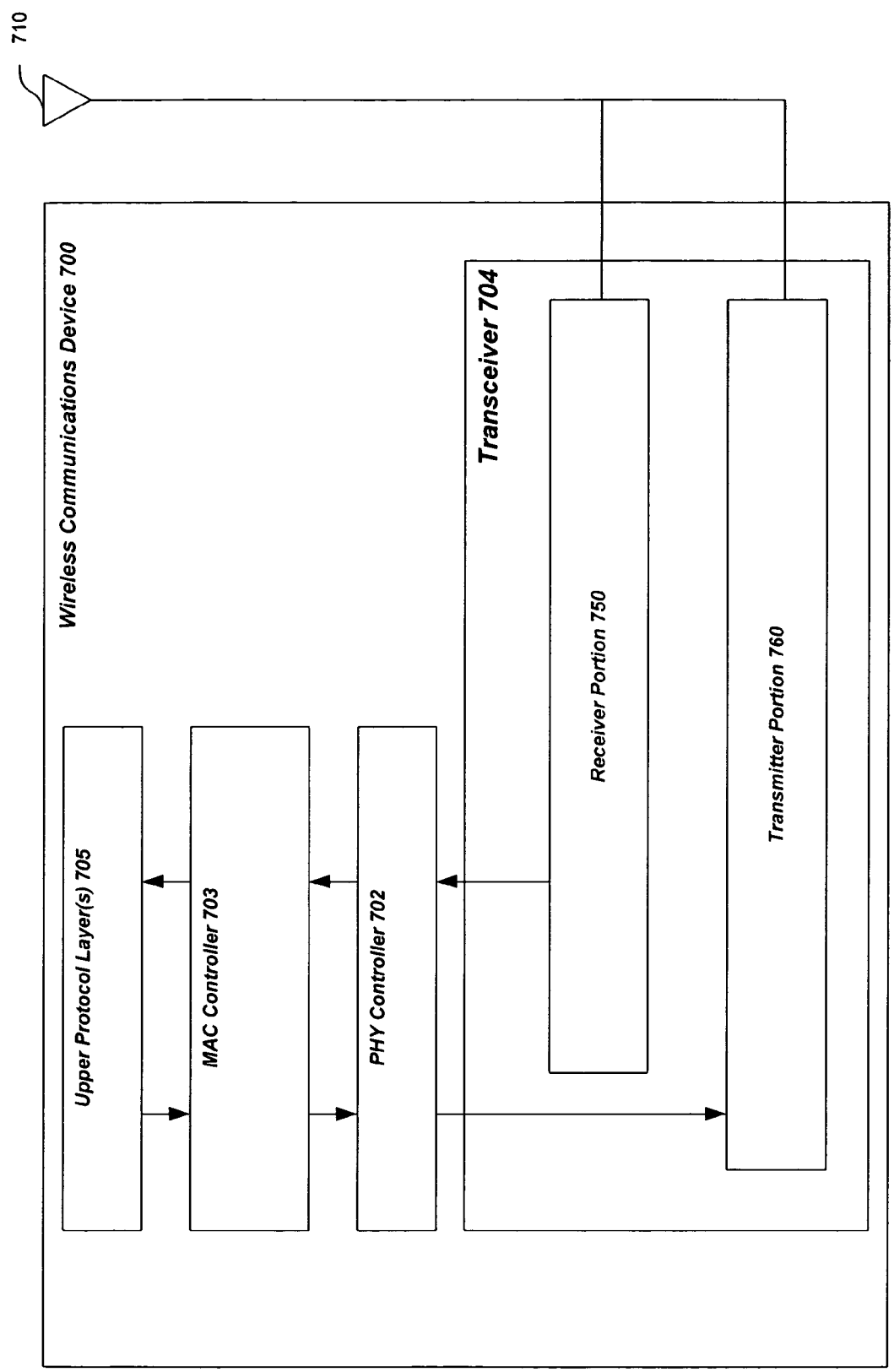
FIG. 7 is a diagram of a device architecture, according to embodiments of the present invention.

FIG. 7 is a diagram of an exemplary wireless communications device 700, according to embodiments of the present invention. This device may operate according to the techniques of the present invention. This device may be used in various communications environments, such as the environment of FIG. 1. As shown in FIG. 7, device 700 includes a physical layer (PHY) controller 702, a media access controller (MAC) 703, transceiver 704, upper protocol layer(s) 705, and an antenna 710.

MAC controller 703 generates frames (data transmissions) and beacons for wireless transmission. In addition, MAC controller 703 receives and processes frames and beacon transmissions that are originated from remote devices. MAC controller 703 exchanges these frames and beacon transmissions with PHY controller 702. In turn, PHY controller 702 exchanges frames and beacon transmissions with transceiver 704. Moreover, in embodiments employing WiMedia, MAC controller 703 performs operations involving the exchange of IEs. For instance, MAC controller 703 is responsible for the processing and generation of IEs, Control/Command frames, and DRP negotiations.

FIG. 7 shows that transceiver 704 includes a receiver portion 750 and a transmitter portion 760. In embodiments of the present invention, transceiver 704 may transmit and receive OFDM signals. Accordingly, in such embodiments, transmitter portion 760 may include components, such as an inverse fast Fourier transform (IFFT) module, a zero padding module, an upconverter, and a transmit amplifier. To receive OFDM signals, receiver portion 750 may include components, such as a downconverter, a receive amplifier, and a fast Fourier transform (FFT) module.

As shown in FIG. 7, device 700 further includes one or more upper protocol layers 705. These layers may involve, for example, user applications. Accordingly, upper layers 705 may exchange information with remote devices. This involves layer(s) 705 exchanging protocol data units with MAC controller 703. In turn, MAC controller 703 operates with PHY controller 702 and transceiver 704 to transmit and receive corresponding wireless signals.

The device of FIG. 7 may be implemented in hardware, software, firmware, or any combination thereof. For instance, the components of portions 750 and 760 may include electronics, such as amplifiers, mixers, and filters. Moreover, implementations of device 700 may include digital signal processor(s) (DSPs) to implement various modules, such as components of receiver portion 750 and transmitter portion 760. Moreover, in embodiments of the present invention, processor(s), such as microprocessors, executing instructions (i.e., software) that are stored in memory (not shown) may be used to control the operation of various components in device 700. For instance, components, such as PHY controller 702 and MAC controller 703, may be primarily implemented through software operating on one or more processors.

Figure 8:
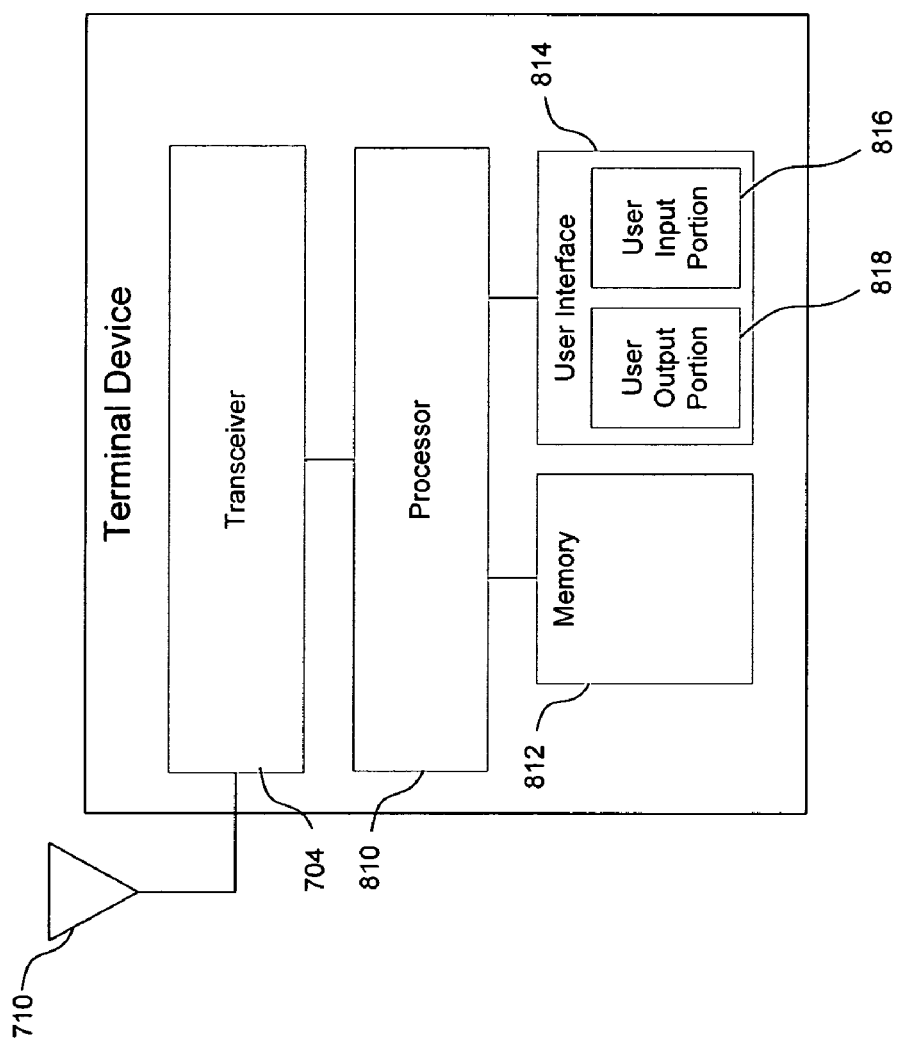
FIG. 8 is a diagram of a wireless communications device implementation, according to embodiments of the present invention.

One such implementation of the FIG. 7 architecture, according to an embodiment of the present invention, is shown in FIG. 8. This diagram illustrates the terminal device implemented according to one embodiment of the present invention. As shown in FIG. 8, this implementation includes a processor 810, a memory 812, and a user interface 814. In addition, the implementation of FIG. 8 includes transceiver 704 and antenna 710. These components may be implemented as described above with reference to FIG. 7. However, the implementation of FIG. 8 may be modified to include different transceivers that support other wireless technologies.

Processor 810 controls device operation. As shown in FIG. 8, processor 810 is coupled to transceiver 704. Processor 810 may be implemented with one or more microprocessors that are each capable of executing software instructions stored in memory 812, for example, as a computer system.

Memory 812 includes random access memory (RAM), read only memory (ROM), and/or flash memory, and stores information in the form of data and software components (also referred to herein as modules). These software components include instructions that can be executed by processor 810. Various types of software components may be stored in memory 812. For instance, memory 812 may store software components that control the operation of transceiver 704. Also, memory 812 may store software components that provide for the functionality of PHY controller 702, MAC controller 703, and upper protocol layer(s) 705.

Moreover, memory 812 may store software components that control the exchange of information through user interface 814. As shown in FIG. 8, user interface 814 is also coupled to processor 810. User interface 814 facilitates the exchange of information with a user. FIG. 8 shows that user interface 814 includes a user input portion 816 and a user output portion 818.

User input portion 816 may include one or more devices that allow a user to input information. Examples of such devices include keypads, touch screens, and microphones. User output portion 818 allows a user to receive information from the device. Thus, user output portion 818 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 8 may be coupled according to various techniques. One such technique involves coupling transceiver 704, processor 810, memory 812, and user interface 814 through one or more bus interfaces. In addition, each of these components is coupled to a power source, such as a removable and/or rechargeable battery pack (not shown).

IX. CONCLUSION

While various embodiments of the present invention have been described above, it should be understood that they have been presented by way of example only, and not in limitation. For instance, the features described herein may be employed in networks other than WiMedia networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a wireless communications device, the method comprising:
   (a) joining to a wireless network including one or more remote devices, wherein all devices belonging to the network have a shared responsibility for maintaining configuration of the network by transmitting and receiving networking information within the wireless network;
   (b) transmitting in the network a beacon indicating a hibernation period during which the wireless communications device is unavailable;
   (c) finding a channel candidate from among a plurality of channels during the hibernation period;
   (d) exchanging information across a current channel with the one or more remote devices, the information regarding the candidate channel; and (e) executing a channel change from the current channel to the candidate channel to establish another wireless network, wherein all devices belonging to said another network have an equal responsibility for maintaining configuration of said another network by transmitting and receiving networking information within said another network.

2. The method of claim 1, wherein the candidate channel and the current channel each employ a corresponding time frequency code (TFC).

3. The method of claim 1, wherein step (c) comprises sending one or more wireless transmissions during a time slot within a repeating time interval.

4. The method of claim 3, wherein the repeating time interval is a WiMedia superframe.

5. The method of claim 1, wherein step (c) comprises sending a request that at least one of the remote devices changes its channel from the current channel to the candidate channel.

6. The method of claim 5, wherein the request includes an indicator of the candidate channel and a countdown timer.

7. The method of claim 5, wherein step (c) further comprises receiving an acceptance of the request from the at least one remote device.

8. The method of claim 5, further comprising establishing a connection across the candidate channel with the at least one remote device.

9. The method of claim 1, wherein step (a) comprises:
selecting a channel finding technique based on whether the wireless communications device has any active connections in the current channel; and
performing the selected channel finding technique.

10. The method of claim 1, wherein step (d) comprises:
selecting a channel changing technique based on whether the wireless communications device has any active connections in the current channel; and
performing the selected channel changing technique.

11. An apparatus, comprising:
means for joining to a wireless network including one or more remote devices, wherein all devices belonging to the network have a shared responsibility for maintaining configuration of the network by transmitting and receiving networking information within the wireless network;
means for transmitting in the network a beacon indicating a hibernation period during which the wireless communications device is unavailable;
means for finding a channel candidate from among a plurality of channels during the hibernation period;
means for exchanging information across a current channel with the one or more remote devices, the information regarding the candidate channel; and
means for executing a channel change from the current channel to the candidate channel to establish another wireless network, wherein all devices belonging to said another network have an equal responsibility for maintaining configuration of said another network by transmitting and receiving networking information within said another network.

12. An apparatus, comprising
a transceiver for communicating with devices across a wireless communications network;
a memory;
a processor that executes instructions stored in the memory for:
(a) joining to a wireless network including one or more remote devices, wherein all devices belonging to the network have a shared responsibility for maintaining configuration of the network by transmitting and receiving networking information within the wireless network;
(b) transmitting in the network a beacon indicating a hibernation period during which the wireless communications device is unavailable;
(c) finding a channel candidate from among a plurality of channels during the hibernation period;
(d) exchanging information across a current channel with the one or more remote devices, the information regarding the candidate channel; and
(e) executing a channel change from the current channel to the candidate channel to establish another wireless network, wherein all devices belonging to said another network have an equal responsibility for maintaining configuration of said another network by transmitting and receiving networking information within said another network.

13. A computer program product comprising a memory for storing computer program code stored therein for enabling a wireless communications device to communicate with remote wireless communications devices across a wireless communications network, the computer program code comprising:
program code for enabling a wireless communications device to join to a wireless network including one or more remote devices, wherein all devices belonging to the network have a shared responsibility for maintaining configuration of the network by transmitting and receiving networking information within the wireless network;
program code for enabling a wireless communications device to transmit in the network a beacon indicating a hibernation period during which the wireless communications device is unavailable;
program code for enabling a wireless communications device to find a channel candidate from among a plurality of channels during the hibernation period;
program code for enabling the wireless communications device to exchange information across a current channel with the one or more remote wireless communications devices, the information regarding the candidate channel; and
program code for enabling the wireless communications device to execute a channel change from the current channel to the candidate channel to establish another wireless network, wherein all devices belonging to said another network have an equal responsibility for maintaining configuration of said another network by transmitting and receiving networking information within said another network.

14. A method in a wireless communications network, comprising:
joining to a wireless network by an initiating wireless communications device, the network including one or more remote devices, wherein all devices belonging to the network have a shared responsibility for maintaining configuration of the network by transmitting and receiving networking information within the wireless network;
selecting a channel finding technique based on whether the initiating wireless communications device has any active connections in a current channel;
performing the selected channel finding technique with a plurality of channels to find a candidate channel;

transmitting in the network a beacon indicating a hibernation period during which the wireless communications device is unavailable;

finding a channel candidate from among a plurality of channels during the hibernation period;

sending a request that the at least one remote device change its channel from said current channel to the candidate channel during a time slot within a repeating time interval;

receiving an acceptance of the request from the at least one remote device;

selecting a channel changing technique based on whether the initiating wireless communications device has any active connections in the current channel;

executing the selected channel changing technique to change a channel from the current channel to the candidate channel to establish another wireless network, wherein all devices belonging to said another network have an equal responsibility for maintaining configuration of said another network by transmitting and receiving networking information within said another network; and establishing a connection across the candidate channel with the at least one remote device.

15. The method of claim 14, wherein said selected channel finding technique further comprises:

broadcasting a beacon transmission that the initiating wireless communications device will hibernate; and scanning for available channels during hibernation, either to find a best available radio channel or to find a specific target device.

16. The method of claim 14, wherein said selected channel finding technique further comprises:

broadcasting a beacon transmission that the initiating wireless communications device will be unavailable for a predetermined number of superframes; and scanning for available channels during said predetermined number of superframes, either to find a best available radio channel or to find a specific target device.

17. The method of claim 14, wherein said selected channel finding technique further comprises:

broadcasting a beacon transmission in the initiating device's old channel;

scanning in a first new channel;

returning to the initiating device's old channel for at least one superframe in order to continue communications therein;

scanning in a second new channel; and returning to the initiating device's old channel for at least one superframe in order to continue communications therein;

whereby the initiating device scans one new channel at a time either to find a best available radio channel or to find a specific target device.

18. The method of claim 14, wherein said selected channel finding technique further comprises:

broadcasting a beacon transmission to inform peer devices in the initiating device's beacon group that the initiating device is performing ongoing channel selection operations;

said peer devices maintaining the initiating device's reservation and status in the initiating device's original channel for a predetermined number of superframes, in response to said broadcasting.

19. The method of claim 14, wherein said selected channel finding technique further comprises:

broadcasting a beacon transmission to inform peer devices in the initiating device's beacon group that the initiating device is performing ongoing channel selection operations for a stated number of superframes;

said peer devices maintaining the initiating device's reservation and status in the initiating device's original channel for said stated number of superframes, in response to said broadcasting.

20. The method of claim 14, wherein said selected channel finding technique further comprises:

broadcasting a beacon transmission to inform peer devices in the initiating device's beacon group that the initiating device will be unavailable for a stated number of superframes;

said peer devices maintaining the initiating device's reservation and status in the initiating device's original channel for said stated number of superframes, in response to said broadcasting.

21. The method of claim 14, wherein said selected channel changing technique further comprises:

transmitting an information element including a list of identifiers of peer devices in the initiating device's beacon group, the information element including a request to change channel with the initiating device; and said peer devices responding whether they accept the request.

22. An apparatus, comprising a transceiver in a wireless communications device, for communicating with remote wireless communications devices across a wireless communications network;

a memory;

a processor that executes instructions stored in the memory for:

joining to a wireless network by the wireless communications device, the network including one or more remote devices, wherein all devices belonging to the network have a shared responsibility for maintaining configuration of the network by transmitting and receiving networking information within the wireless network;

selecting a channel finding technique based on whether the wireless communications device has any active connections in a current channel;

performing the selected channel finding technique with a plurality of channels to find a candidate channel;

transmitting in the network a beacon indicating a hibernation period during which the wireless communications device is unavailable;

finding a channel candidate from among a plurality of channels during the hibernation period;

sending a request that the at least one remote device change its channel from said current channel to the candidate channel during a time slot within a repeating time interval;

receiving an acceptance of the request from the at least one remote device;

selecting a channel changing technique based on whether the wireless communications device has any active connections in the current channel;

executing the selected channel changing technique to change a channel from the current channel to the candidate channel to establish another wireless network, wherein all devices belonging to said another network have an equal responsibility for maintaining configuration of said another network by transmitting and receiving networking information within said another network; and establishing a connection across the candidate channel with the at least one remote device.

23. The apparatus of claim 22, wherein the network is a peer-to-peer network.

24. The apparatus of claim 22, wherein the candidate channel and the current channel each employ a corresponding time frequency code (TFC).

25. The apparatus of claim 22, wherein the repeating time interval is a WiMedia superframe.

26. The apparatus of claim 22, wherein the request includes an indicator of the candidate channel and a countdown timer.

27. A computer program product comprising a memory for storing computer program code stored therein for enabling a wireless communications device to communicate with remote wireless communications devices across a wireless communications network, the computer program code comprising:

program code for joining to a wireless network by a wireless communications device, the network including one or more remote devices, wherein all devices belonging to the network have a shared responsibility for maintaining configuration of the network by transmitting and receiving networking information within the wireless network;

program code for selecting a channel finding technique based on whether the wireless communications device has any active connections in a current channel;

program code for performing the selected channel finding technique with a plurality of channels to find a candidate channel;

program code for transmitting in the network a beacon indicating a hibernation period during which the wireless communications device is unavailable;

program code for finding a channel candidate from among a plurality of channels during the hibernation period;

program code for sending a request that the at least one remote device change its channel from said current channel to the candidate channel during a time slot within a repeating time interval;

program code for receiving an acceptance of the request from the at least one remote device;

program code for selecting a channel changing technique based on whether the wireless communications device has any active connections in the current channel;

program code for executing the selected channel changing technique to change a channel from the current channel to the candidate channel to establish another wireless network, wherein all devices belonging to said another network have an equal responsibility for maintaining configuration of said another network by transmitting and receiving networking information within said another network; and program code for establishing a connection across the candidate channel with the at least one remote device.

* * * * *